J. H. DEAN.
VOTING MACHINE.
APPLICATION FILED SEPT. 17, 1908.
995,329.
Patented June 13, 1911.
7 SHEETS—SHEET 6.
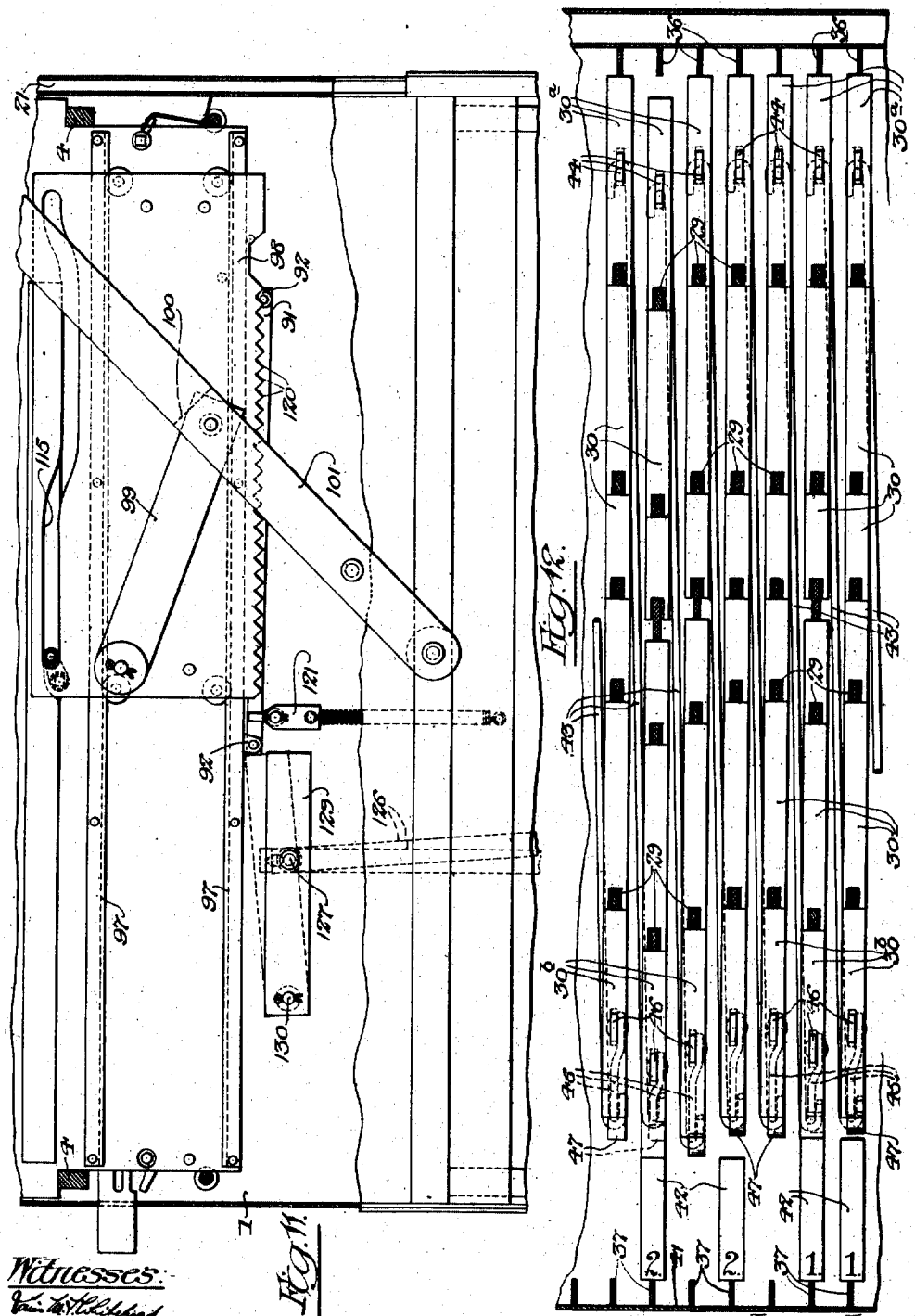

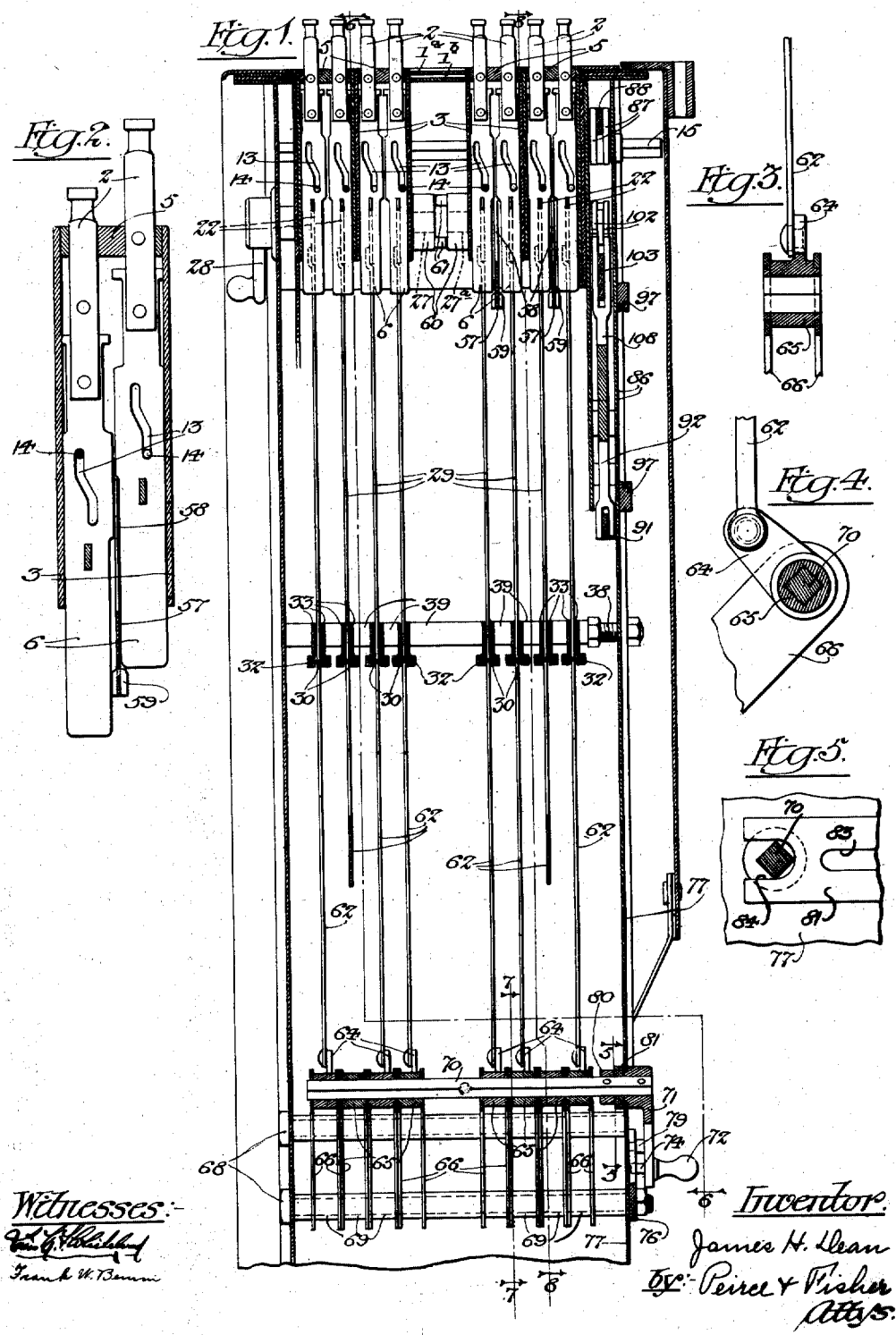

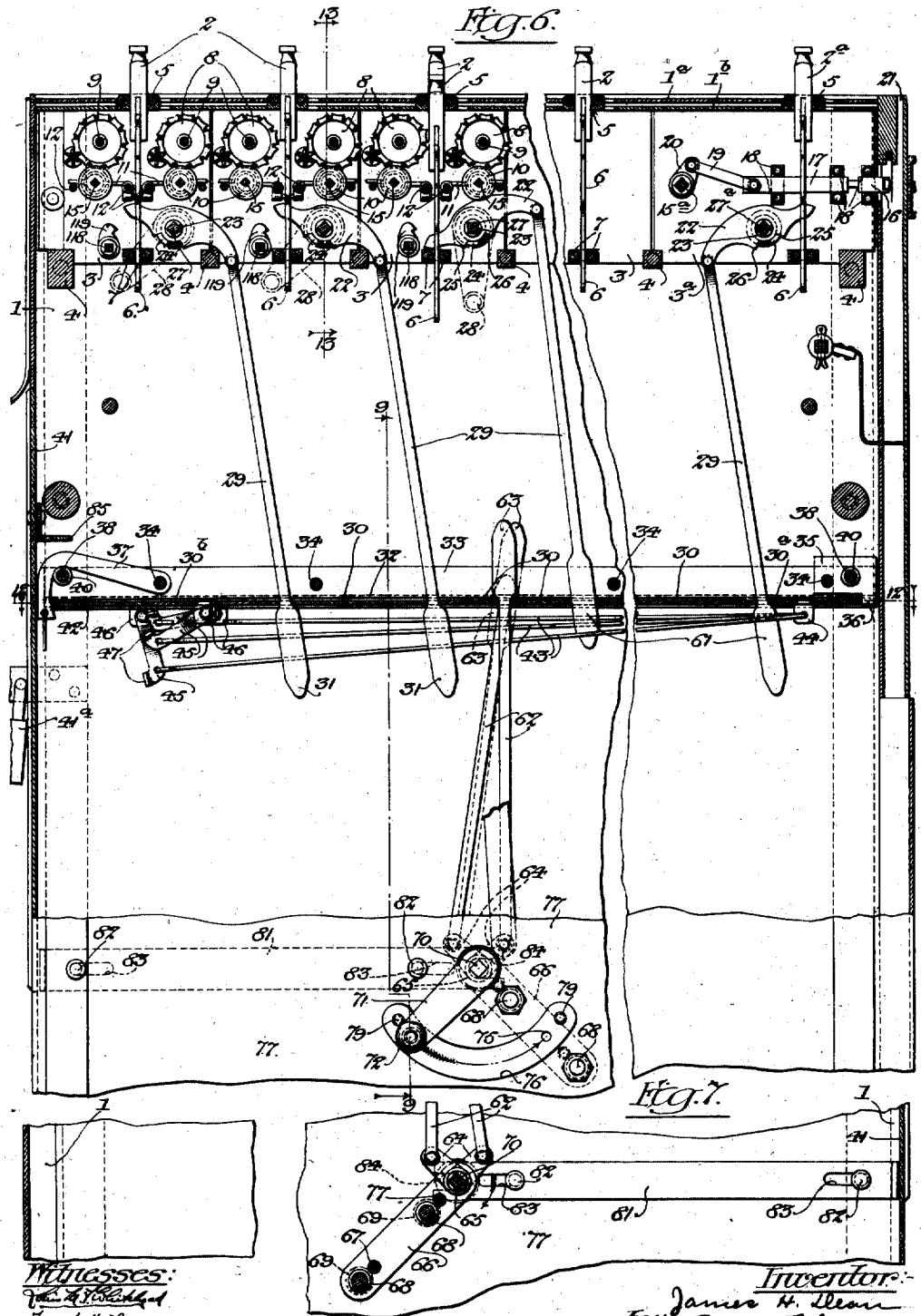

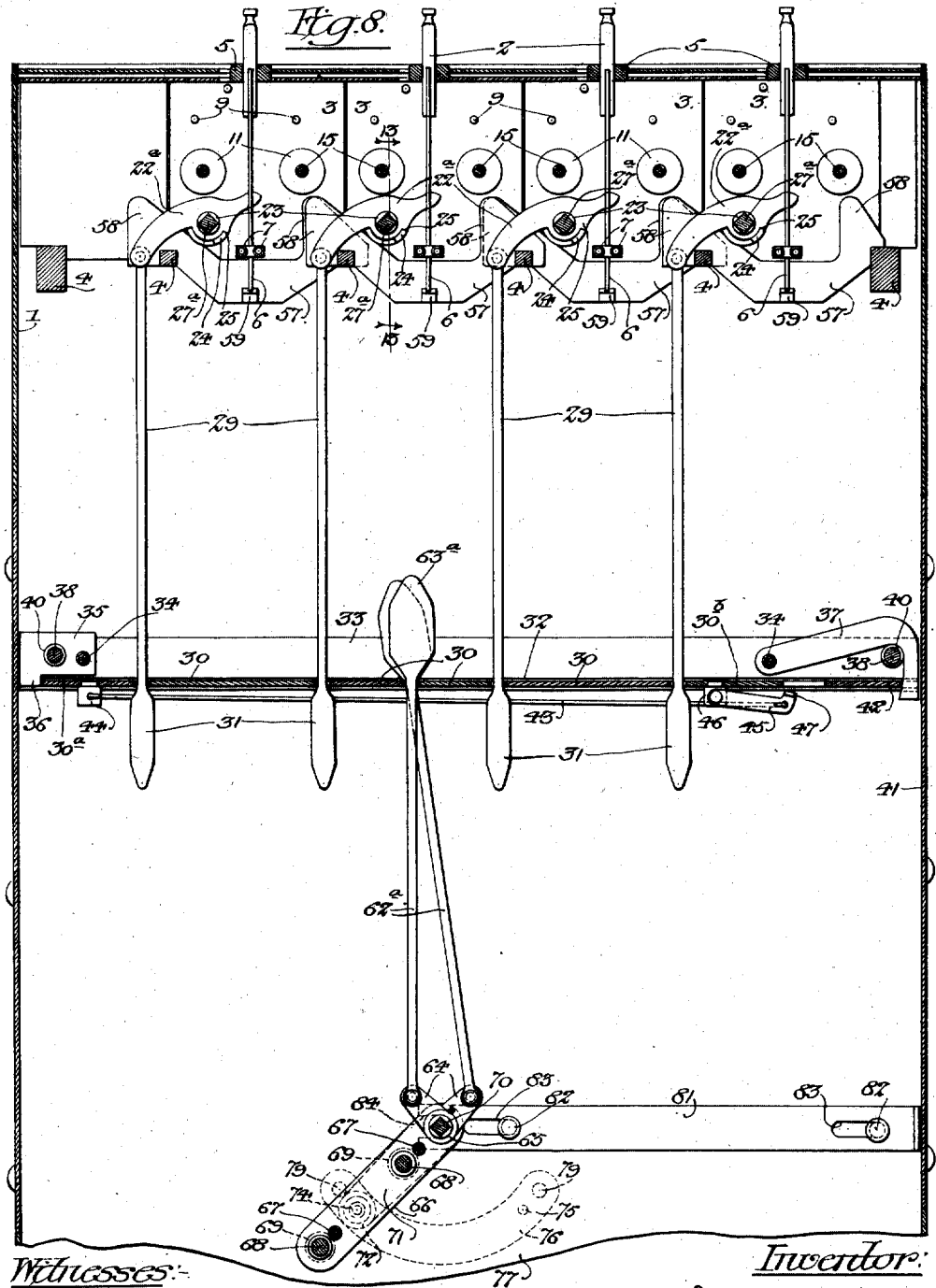

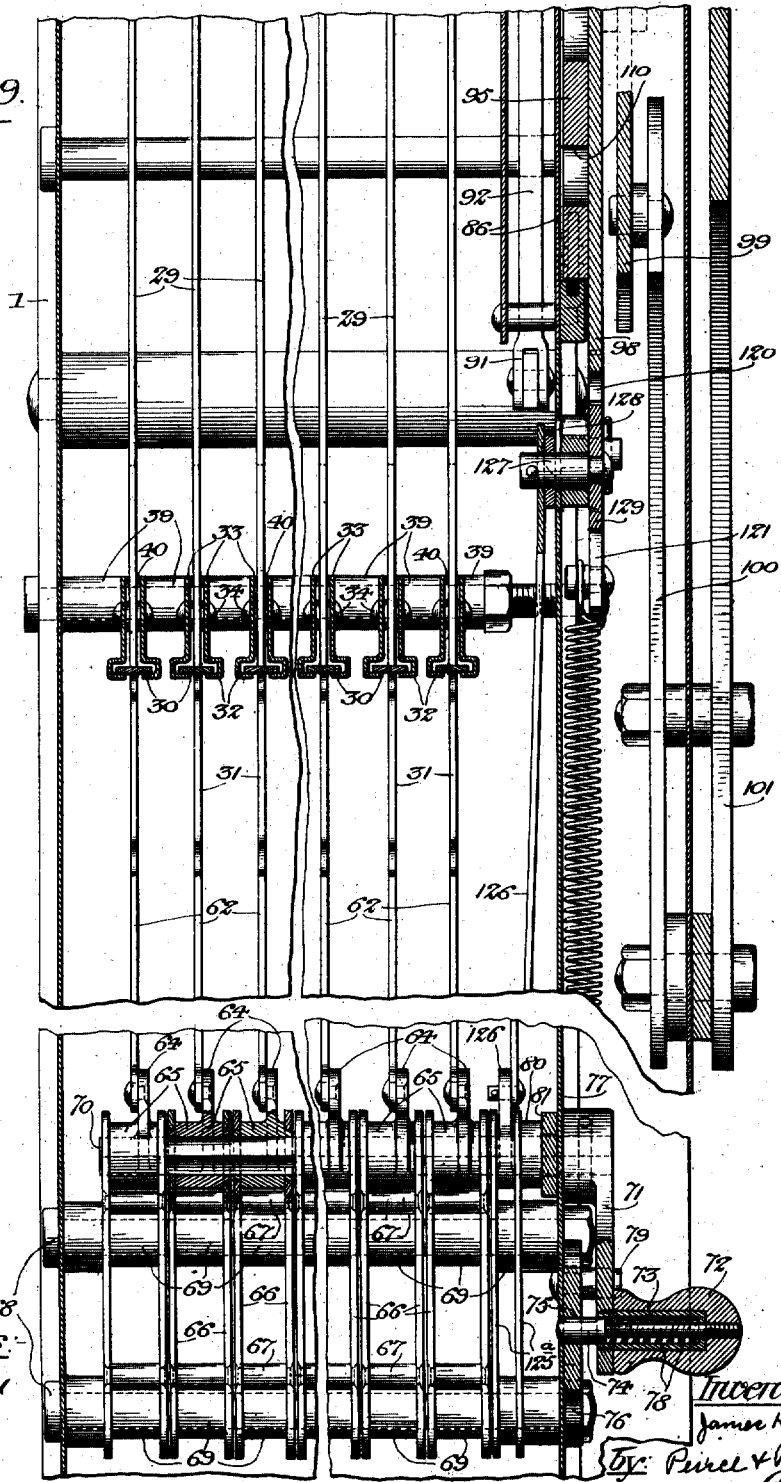

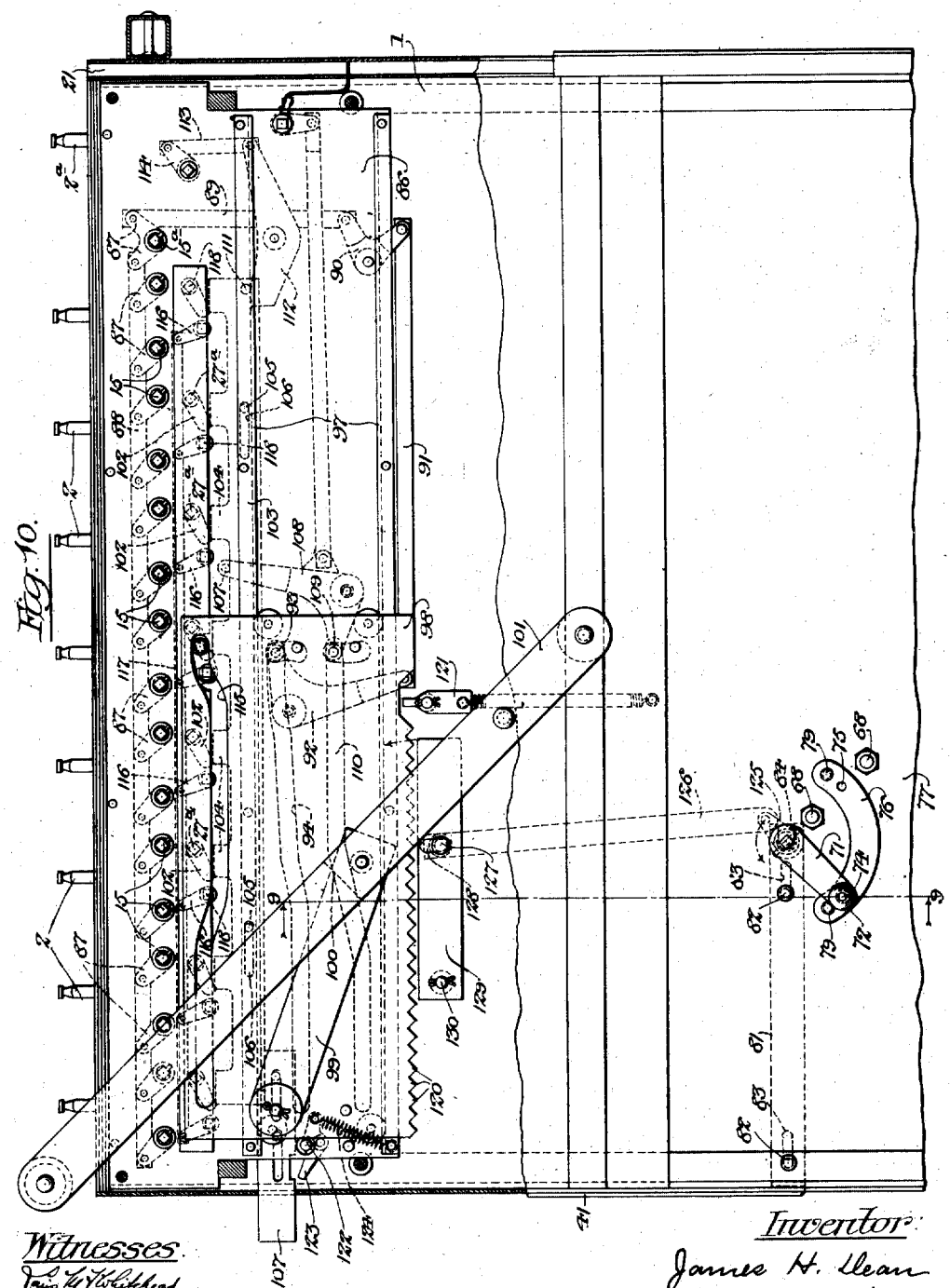

J. H. DEAN.
VOTING MACHINE.
APPLICATION FILED SEPT. 17, 1908.
995,329.
Patented June 13, 1911.
7 SHEETS—SHEET 7.
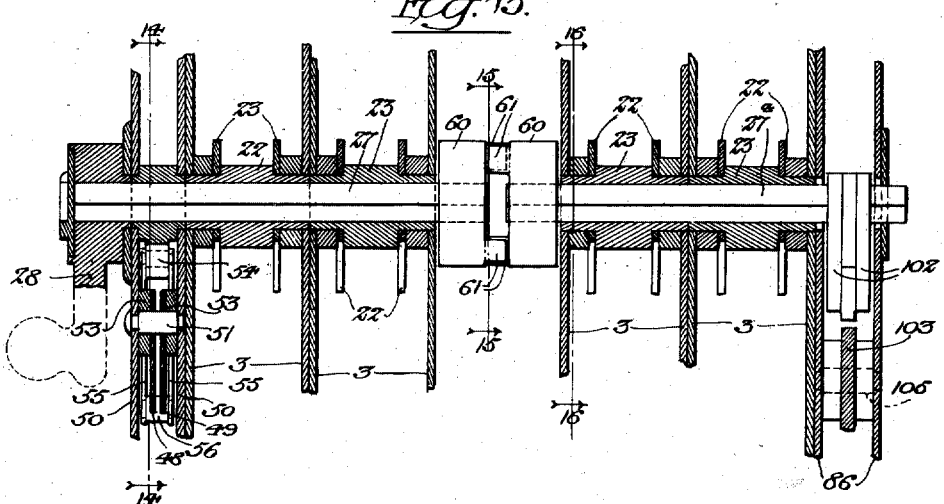
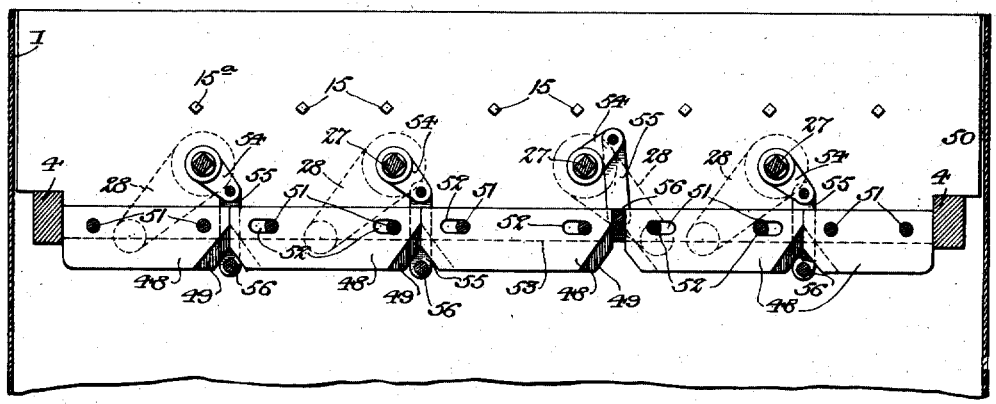
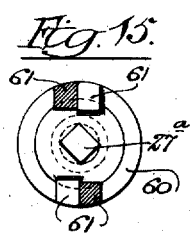
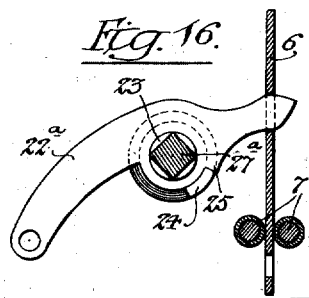
Witnesses:—
Inventor:
James H. Dean
By Peirce & Fisher
Attys.

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

995,329. Specification of Letters Patent. Patented June 13, 1911.

Application filed September 17, 1908. Serial No. 453,477.

*To all whom it may concern:*

Be it known that I, JAMES H. DEAN, a citizen of the United States, and a resident of Chicago, county of Cook, and State of Illinois, have invented certain new and useful Improvements in Voting-Machines, of which the following is a specification.

The invention relates to voting machines and more particularly to mechanism for preventing restricted or class voters from casting ballots for certain offices, and to mechanisms for voting "yes" and "no" on questions and amendments.

The invention seeks to provide simple and effective class voting and amendment mechanism, together with means whereby the amendment devices may be locked out by the class voting mechanism.

The invention consists in the features of improvement, combinations and arrangements of parts hereinafter set forth, illustrated in the accompanying drawings and more particularly pointed out in the appended claims.

The invention is particularly applicable to and is shown in connection with the type of voting machine set forth in prior applications filed by me December 27, 1902, Serial No. 238,368, and April 3, 1907, Serial No. 365,639, although the invention, and particularly some of the features thereof, could be adapted to other forms of voting machines.

In the drawings, Figure 1 is a vertical section taken from the rear of the machine. Fig. 2 is a detail section of one of the amendment voting mechanisms. Figs. 3 and 4 are detail sections of part of the lockout for class or restricted voters. Fig. 5 is a detail section on the line 5—5 of Fig. 1. Fig. 6 is a vertical section taken from side to side of the machine on the line 6—6 of Fig. 1 and with a portion of the back plate of the machine shown in elevation. Fig. 7 is a detail section taken on the line 7—7 of Fig. 1 of the class voters' lock-out and looking toward the rear of the machine. Fig. 8 is a vertical section from side to side of the machine on the line 8—8 of Fig. 1 and illustrating the mechanisms for voting on questions of amendments and the class voters' lock-out therefor. Fig. 9 is a detail view on an enlarged scale with parts shown in section on the line 9—9 of Fig. 6. Fig. 10 is a view of the rear of the machine with the back plate broken away to show the operating mechanism. Fig. 11 is a view of a portion of the operating mechanism and is similar to Fig. 6 but with the operating mechanism shown at the other end of its movement. Fig. 12 is a detail plan view of a portion of the interlocking mechanism with parts omitted for the sake of clearness and parts shown in section on the line 12—12 of Fig. 6. Fig. 13 is a detail view of one of the locking and restoring shafts with parts mounted thereon shown in section on the lines 13—13 of Figs. 6 and 8. Figs. 14, 15 and 16 are detail sections on the lines 14—14 15—15 and 16—16 respectively of Fig. 13.

As set forth in the prior applications referred to, the machine is provided with a box-like frame 1 and the voting keys are arranged upon the upper, horizontal face of the machine frame, preferably in office rows extending from side to side of the machine and in party columns extending from front to rear thereof. The voting keys are arranged in removable units or sections each of which carries two keys, the counters controlled by the two keys and restoring and locking devices for the keys. Each counter section or unit comprises two connected side-plates 3 and the sections are mounted at the upper portion of the machine on horizontal cross-supports 4, so that the keys carried by the sections are arranged in office rows extending from side to side of the machine and party columns extending from front to rear thereof. Each key is guided at its upper end in a block 5 fixed to the counter section and is provided with a depending tailpiece 6 which extends between a pair of guide pins or rollers 7 at the lower edge of the counter section. The counters for the two keys of a section are arranged on opposite sides of the keys and comprise counter wheels 8 mounted upon cross shafts or pins 9 that extend between side-plates 3 of the counter section. The unit wheel of each counter is provided with a Geneva stop gear which coöperates with a Geneva stop actuator 9. The actuators 9 are rotatably mounted in supports 10 that are axially shiftable on the cross-pins 11. The tailpieces 6 of the voters' keys are provided with cam slots 12 which engage pins 13 connected to the actuator supports 10 so that as the ballot indicators or keys are shifted longitudinally to and from voted position, the counter actuators 9 are shifted in axial direction into and out of operative relation with the corresponding counters. The actuators 10 of the several counter sections are arranged in line and a series of shafts 15 extend through the actuators. These shafts are oscillated by the operating mechanism to advance the counters corresponding to the voted keys one step. This counter mechanism is fully set forth in the prior applications above referred to and need not be more fully described here.

A column of keys $2^a$ at one side of the machine are used for voting for irregular candidates. These keys are carried in their sections similar to the counter sections, and each comprises a pair of connected side-plates $3^a$ mounted upon the cross supports 4. The tail portion 6 of each key $2^a$ is arranged to control a printing plunger 16 that is operated by a sliding actuator 17. The plunger and actuator are arranged to slide between guide pins 18 extending between the side-plates 3. The plunger actuator 17 is connected by a link 19 to a crank-arm 20 that is journaled between the side-plates $3^a$. The hubs of these crank-arms are arranged in line and one of the actuator shafts $15^a$ extends therethrough to reciprocate the plunger actuator 17 when it is oscillated by the operating mechanism. Each irregular key $2^a$ is arranged to connect and disconnect the corresponding plunger and actuator as it is shifted to and from voted position. The plungers 16 are arranged to impress a card inserted into the machine through a slot 21 beside the column of keys $2^a$. The plungers print different numbers on the cards so as to identify the names of irregular candidates written thereon with the different offices. This irregular mechanism is more fully set forth in an application filed by me July 25, 1905, Serial No. 271,216.

The tail-piece 6 of each of the regular and irregular keys is arranged to engage one end of a rocker-arm 22. The two rocker-arms of the keys of each section are loosely mounted upon a hub 23 journaled between the side-plates of the section. Laterally extending lugs 24 on the hubs 23 extend between pairs of shoulders 24 and 25 on the rocker-arms 22. A series of locking and restoring shafts 27 extend through the hubs 23 and arranged to be oscillated by the operating mechanism of the machine. The operating mechanism normally holds the shafts 27 against movement with the keys 2 and $2^a$ in their raised or unvoted position. In this position of the parts the lugs 24 on the hubs 13 engage the shoulders 25 of the rock arms 22 and lock the rock arms and keys in unvoted position. When the voter is admitted to the machine, the shafts 27 are unlocked so that he may depress the keys to voted position. When the voter leaves the machine, and at the end of the voting operation, the shafts 27 are rocked back to restore the rock arms and keys and lock them in normal position. The central key in the row shown in Fig. 6, is in its depressed or voted position. As there shown, this movement of the key will move the rock shaft 23 through an eighth of a turn. The space between the shoulders 25 and 26 is greater than the width of the lugs 24, so that this movement of the shaft 27 and the hubs 23 thereon will not shift any of the other keys in the same column and connected to the same shaft, but the shift of the shaft will merely serve to take up the lost motion between the lugs 24 and the shoulders 26 on the rock arms of the other keys. These shafts are not only locking and restoring shafts, but are also employed as straight ticket members, and for this purpose are provided on their forward ends with straight ticket cranks or keys 28. By means of the key, the shaft may be rocked in the direction indicated by the arrow in Fig. 6 to first take up the lost motion between the lugs 24, which turn with the shaft and the shoulders 26 on the rock arms and then, through the medium of the engagement of the lugs 24 with the shoulders 26, shift the rock arms and shift the column of keys connected thereto to voted position. The movement of the shaft 27, effected by the straight ticket key 28, must be through a full quarter turn to effect its operation.

The regular candidate keys and irregular voting keys are provided with interlocking mechanism comprising a series of interlocking straps or arrows 29 that are pivotally connected at their upper ends respectively to the tail portions of the rock arms of the corresponding keys. The interlocking straps or arrows 29 extend downwardly, each between a pair of interlocking blocks 30, and the arrows are provided on their lower ends with spreaders 31 for the blocks. The blocks 30 are arranged in rows which correspond to the separate office rows of keys, and each row of blocks is arranged to slide in horizontal direction in a suitable guide or channel 32 formed in the lower portion of two side plates 33 which are connected together and suitably spaced apart by shoulder rivets 34.

There is, as stated, one row of blocks and interlocking arrows or spreaders for each office row of keys. The arrows are longitudinally movable by the keys to spread the blocks apart and the arrows and blocks are laterally movable in the horizontal guide channel independently of the keys. By limiting the lateral shift of the blocks, the number of spreaders which can be moved longitudinally to position between them and the number of keys which can be shifted to voted position can be properly limited. For this purpose each channel is provided at one end with a stop plate 35, having a lug 36 which extends downwardly into the path of movement of the end block 30$^a$ in the channel. At its opposite end each channel is provided with a hook 37 that is pivotally mounted on one of the rivets 34 and the end of which is arranged to extend downwardly into the path of movement of the opposite end block 30$^b$ in the channel. The hook 37, in normal position, rests upon one of the supporting rods 38 for the guide channels. These rods extending through the ends of the plates 33 which form the guide channels are all connected at front and rear to the machine frame. Spacing sleeves 39 are arranged on the supporting rods 38 between the separate guides or channels and a spacing sleeve 40 on the rod 38 is arranged between the pair of plates of each separate guide or channel, as shown in Fig. 9.

A side door 41 on the machine frame is normally locked in position. By removing this side door the hooks 37 may be lifted to open the ends of the interlocking guides or channels. Where a row of keys are to be arranged in a single candidate group a grouping block 42 of proper length will be inserted in the corresponding channel between the end block 30$^b$ and the adjacent hook 37, so that only one spreader and key in that row can be voted. The row of interlocking devices shown in Fig. 6 and the two lower rows shown in Fig. 12 are arranged for single candidate groups.

To arrange separate rows of keys and interlocking devices in groups tie rods are employed for connecting the opposite end blocks of adjacent rows. Each tie rod 43 is connected at one end to a depending lug 44 on an end block 30$^a$ and at its opposite end is connected to the opposite end block 30$^b$ of the next adjacent row through the medium of a swinging link or dog 45. These dogs or links are pivotally connected at one end to the tie rods and at their opposite ends to depending lugs 46 on the end blocks 30$^b$, and each link is provided with a projecting lug 47 on its end, which may be engaged with the channel 32 to hold the link 45 and tie rod 43 in horizontal position, and thereby connect the opposite end blocks of two adjacent rows to move in unison. By removing the dog or link from the channel the two end blocks connected by the link and the corresponding tie rod may move independently of each other.

To connect a number of adjacent rows into groups the end blocks 30$^b$ in all the rows except the last row in the group are connected to the opposite end blocks 30$^a$ of the adjacent rows in the groups by means of the dogs or links 45 and tie rods 43. Between the last end block 30$^b$ of the group and the adjacent hook a grouping block 42 of proper size will be inserted to limit the movement of the entire group of blocks and spreaders, as desired. In Fig. 12 two multi-candidate groups are shown, each so arranged that any two keys in the group can be voted. This interlocking mechanism is more fully set forth and claimed in an application filed by me September 17, 1908, Serial No. 453476.

The keys 2 merely serve to set the counter actuators into and out of operative position and the interlocking arrows may be moved into and out of line with the rows of blocks so that any voted key can be retracted to correct or change a vote. This is true also of the irregular voting keys 2$^a$, since these keys merely serve to connect and disconnect the printing plungers 16 and the actuators 17 therefor.

A supplemental interlock is arranged between the combined straight ticket and restoring shafts 27 so that strains can not be exerted on the main interlock through the medium of the straight ticket keys 28. This supplemental interlock is illustrated in Figs. 13 and 14 and is also set forth in a prior application filed by me November 8, 1907, Serial No. 401,223. This supplemental interlock comprises two rows of blocks 48 and 49, which are arranged in a section at the front of the machine. This section comprises two connected side plates and is provided with cross pins 51 at its lower edge which extends through longitudinal slots in the upper edges of the two rows of overlapping blocks 48 and 49. A pair of space bars 53 are also arranged upon the pins 51 between the plates 50 and the inner and outer rows of blocks 48 and 49. The combined straight ticket and restoring shafts 27 extend through the plates 50 above the rows of blocks therein and each engages the hub of a crank arm 54 that is journaled between the plates 50. These crank arms are each provided with a pair of links 55 which extend downwardly on opposite sides of the rows of blocks 48 and 49 and are provided at their lower ends with a spreader pin 56 for the interlocking blocks 48 and 49. The lower corners of the blocks are cut away to form bevels against which the spreader pins act. These bevels are so arranged that each one of the outer row of blocks has a long interlocking face on its left hand end and a short interlocking face on its right hand end, while each of the inner row of blocks is provided with a long interlocking face at its right hand end and a short interlocking face at its left hand end. When any straight ticket key is moved to voted position the spreader pin will engage the short interlocking face of the adjacent blocks in both the inner and outer rows so that all lost motion in the set of blocks is taken up and none of the other shafts 27 can be shifted. All keys, both straight and individual candidate keys, are thus locked against movement unless the voted straight ticket key is retracted. The shafts 27, however, move as stated through a one-eighth turn when any of the individual keys connected thereto are voted. When one of the shafts is so moved the spreader pin 56 connected thereto will only engage the long interlocking faces of the adjacent blocks in the inner and outer rows, but if individual keys in two separate party tickets or columns are voted the blocks 48 and 49 will be moved together and no straight ticket key can be completely turned through one-quarter revolution from normal to its voted position unless some of the individual keys which have been voted are first retracted.

For testing affirmative and negative votes on amendments and questions means are provided for interlocking the two keys of any section so that only one of them can be voted. This interlocking means comprises a plate 57 (see Figs. 1, 2 and 8), which is provided with upwardly projecting lugs 59 at its ends which are notched to set over the supporting cross bars 4. The lower central portion of the plate is provided with a lug 59, preferably formed of a short piece of metal inserted through an opening at the center of the plate and adjacent its lower edge, with the ends of the metal strip bent down against the opposite face of the plate, as shown in Fig. 2. When the two keys of one of the counter sections are to be employed for voting on an amendment or question, one of the interlocking plates 57 will be mounted upon the supports 4 with the central part of the plate extending between the lower ends of the tail pieces 6 of the keys and below the guides 7. In this position the lug 59 will be just below the lower inner corners of the tail pieces 6. This lug is wider than the space between the tail pieces 6, so that, if one of the keys is shifted to voted position, as shown in Fig. 2, the plate 57 will be moved laterally and the lug 59 thereon will lock the other key. By retracting the voted key the other key may be voted, but both can not be placed in voted position at the same time. In this way any of the counter sections may be adapted for voting on amendments. The lower corners of the tail pieces 6 of the keys are preferably rounded and coöperate with the upper rounded surface of the lug 59 to shift the locking plate 57 laterally.

The amendment sections may be arranged at any part of the machine, but as shown they are arranged at the back of the machine. That is to say, the first four keys in each of the columns that extend from front to rear of the machine or the first four rows of keys that extend from side to side of the machine are arranged for voting on amendments and the two keys of each section are provided, as shown in Figs. 1 and 8, with an interlocking device 57. When the keys for voting on amendments and questions are thus arranged in line with the party columns of keys it is necessary that they be disconnected from the straight ticket keys. For this purpose the rock arms 22$^a$ (see Fig. 16) that are connected to the amendment keys are of special form. That is to say, they are similar in all respects to the rock arms 22 for the regular keys, except that the shoulder 26 is cut away so that the shift of the lugs 24 effective for the straight ticket shafts will not move the rock arms 22$^a$ or the amendment keys connected thereto. The shift of the shaft in the opposite direction, however, will bring the lugs 24 against the shoulders 25 on the rock arms 22$^a$ to restore any amendment keys which may have been voted. It is also necessary to provide means whereby the supplemental interlocking mechanism for the straight ticket shafts will not prevent the operation of the amendment keys when one of the straight ticket shafts is moved fully to its voted position. For this purpose the locking and restoring shaft is divided into two parts or sections 27 and 27$^a$. The part 27 extends through the sections having the regular candidate keys and the section 27$^a$ extends through the sections having amendment keys. At their adjacent ends the sections 27 and 27$^a$ are provided with heads 60, each having at diametrically opposite points a pair of projecting pins 61. These pins abut, as shown in Fig. 15, and form a one-way connection between the separate shaft sections 27 and 27$^a$. The shaft sections 27$^a$ are connected at their rear ends to and are controlled by the operating mechanism, and when these shafts 27$^a$ are rocked by the operating mechanism, at the end of the voting operation, the shafts 27$^a$ are also rocked through the medium of the one-way connections described and the voted keys, both amendment and regular keys, will be restored to normal position. The one-way connection, however, between each pair of shafts 27 and 27$^a$ permits the movement of the shaft 27$^a$ and the voting of any of the amendment keys, even though a straight ticket key has been voted and the shafts 27 locked against movement by the supplemental interlocking devices at the forward ends of these shafts.

The class voters' lock-out for the machine comprises a set of supplemental spreaders 62 for the rows of interlocking blocks 30. There is one of these supplemental spreaders for each row of blocks and they extend upwardly through the rows as shown in Figs. 6 and 8 and are provided on their upper ends with enlarged spreader portions 63. At their lower ends (see Figs. 3, 4 and 9) the arrows 62 are connected to a series of arms 64. Each arm is provided with a hub portion 65 that is journaled in a frame consisting of a pair of side plates 66 that are connected by shouldered cross-pins 67. The frames which carry the rock arm 64 are mounted side by side on a pair of supporting bolts 68 which extend from front to rear through the plates 66 and through spacing sleeves 69 arranged between the plates 66. The hubs 65 of the arms 64 are thus held in line and are provided with a square opening through which extends a square operating shaft 70. At its rear end the shaft is provided with a crank 71 and a handle 72 is arranged upon a hollow pin 73 on the end of the crank. A plunger 74, fixed at its outer end to the handle 72, extends through the hollow pin 73 and is arranged to engage one or the other of a pair of openings 75 in a segment 76 fixed to the back plate 77 of the machine. A spring 78 arranged within the hollow pin 73 extends between the end thereof and a shoulder on the plunger 74. By means of the handle the plunger may be moved out and to either of the holes 75 and the crank 71 shifted. Stops 79 on the segment 76 limit the movement of the handle 71 and shaft 70 to one quarter of a revolution. The shaft 70 is longitudinally shiftable through the hubs of the crank arms 64, and when the shaft is withdrawn the crank arms may be placed in either of two positions, so that when the shaft is again inserted some of the arms will be in line with the crank handle 71 and others at right angles thereto, as shown in Fig. 7. Then when the handle 71 is shifted through a quarter turn the spreader 62 connected with the arms in line with the handle will merely move idly from one side to the other of the shaft 70. The spreaders, however, connected with the arms at right angles to the handle will be drawn down by this shift into the rows of blocks to take up the lost play and prevent the operation of the other spreaders associated with the same row and of the keys connected thereto. By properly adjusting the arms 64, therefore, before an election, the lock-out may be so arranged that, when the crank 71 is shifted from normal position, certain of the office groups of keys will be locked out and certain others will be left free for operation by the restricted or class voter. By having one supplemental spreader for each office row both single candidate and multi-candidate groups may be locked out. In Fig. 12 the upper group of two and the upper single candidate group are shown locked out by the class voters' mechanism.

To lock the class voters' mechanism in adjusted position the shaft 70 is provided at its rear end with a collar 80 (see Figs. 1 and 9), and a locking bolt 81 is arranged to engage the collar to permit the longitudinal removal of the shaft 70. The bolt 81 is movably mounted upon the back plate 77 of the machine by means of pins 82 which extend through slots 83 in the bolt. At its inner end the plate is provided with a notch 84 (see Fig. 5), which is arranged to extend over the shaft 70 and thereby bring the end of the bolt opposite the collar 80 to prevent the withdrawal of the shaft 70. The outer end of the bolt 81 is, in its locked position, engaged by the door 41. In its released position the bolt projects outwardly so that the door can be placed on the machine until the plate 81 is set in locking position. This guards against carelessness of the custodian and compels him to lock the class voters' mechanism in adjusted position before he can place the side door in position. For a similar reason the side door 41 is provided with a projecting angle bar 85, which is arranged to hold down the locking latches for the interlocking mechanism so that the latter will remain in the condition in which it is placed by the custodian of the machine.

To lock out the amendment keys when a restricted voter is admitted to the machine the rock arms 22$^a$ connected to these keys are provided with interlocking arrows 29 and rows of blocks 30 which are similar to those of the regular candidate keys. The grouping block 42, however, in each of the rows of blocks for the amendment keys is of such size that all of the keys in the corresponding row may be shifted to voted position. The interlocking arrows and blocks therefore do not act to limit the number of keys which may be operated. The supplemental arrows 62$^a$, which extend within the rows of blocks associated with the amendment keys, are provided with spreader portions 63$^a$ of sufficient size to take up all lost play in the rows of blocks. That is to say, if there are four amendment keys in each row the lost play in the row of blocks will permit the operation of all four of the keys, but, when the class voters' lockout is operated and the corresponding spreader 63$^a$ drawn down into the row of blocks, all the space will be taken up and none of the keys can be operated. This lock-out for the amendment keys has the same operating shaft 70 as the lock-out for the candidate keys, and it is in a similar manner adjustable so that the amendment keys in the different rows may be variably locked out in accordance with the requirements of the different locations.

The operating mechanism at the back of the machine, as set forth in the prior applications referred to, comprises a main operating section formed of connected side plates 86 that extend from side to side of the machine. A series of rock arms 87 journaled in the main operating section engage the ends of the actuator shaft 15 and are connected together by a common bar 88. The arm on the end actuator shaft 15ᵃ is in the form of a bell crank and is connected by a vertical link 89 to a bell crank 90, journaled at the lower portion of the main operating section. A horizontal link 91 connects the bell crank 90 to the lower end of a shifter or operating bell crank 92 that is pivotally mounted in the operating section. The other arm of this bell crank is provided with a pin 93 which engages a slot 94 in a cam plate 96, which is arranged to slide between guides 97 on the back of the main operating section 86. A ratchet plate 98 secured to the cam plate is connected by a link 99 to a crank arm 100 and this crank arm is connected to an operating lever 101.

The locking and restoring shafts 27ᵃ engage crank arms 102 in the main operating section. A reciprocating bar 103 in the main operating section is provided with lugs 104 that normally engage the arms 102 and hold the shafts 27ᵃ and 27 and the keys connected thereto against movement. This bar is mounted to slide on cross pins 105 which extend through slots 106 therein. The bar 103 is shifted in one direction to unlock the keys by a judge's intervening bar 106, which is arranged to engage the end of the locking bar 103. The latter is shifted in the opposite direction to rock the shafts 27ᵃ and 27 and restore and lock the keys by an operating bell crank 108 that is provided with a pin 109 engaging a cam slot 110 in the cam plate 95. A pin 111 on the end of the bar 103 controls an arm 112 that is connected by a link 113 to a crank arm 114 that engages the restoring shaft 27ᵈ for the irregular candidate keys.

A cam slot 115 in the upper portion of the ratchet plate 98 controls a series of crank arms 116 that are connected by a rod 117 and engage a series of shafts 118. These shafts control dogs 119 (see Fig. 6), arranged within the counter sections to engage the ends of the rock arms 22 to complete the movement of any partially voted key and to lock the keys and actuators either in voted or unvoted position during the operation of the actuators upon the counters. The lower edge of the ratchet plate 98 is provided with a series of teeth 120, which coöperate with a full stroke dog 121 to compel the complete shift of the operating mechanism in one or the other direction.

When the voter is admitted to the machine the operating mechanism is at the right side of the machine, when viewed from the rear, as in Figs. 10 and 11. He first shifts the carriage of the operating mechanism to the left, as shown in Fig. 10. This moves the crank arm 92 to oscillate the actuator shafts and also moves the bell crank 108 to release the locking bar 103. At the end of its shift the carriage of the operating mechanism engages a pin 122 on a latch 123 and shifts the latch to release the intervening bar 107. This latch is normally held by a spring 124 into engagement with a notch in the lower edge of the bar to lock it against movement. When the latch is unlocked the judge may shift the bar inwardly to move the locking bar 103 and release the shafts 27 and 27ᵃ so that the keys may be voted. When the keys are set by the voter as desired, the main operating lever and carriage are returned to the right to rock the actuator shafts 15 and advance the counters corresponding to the voted keys. At the end of its movement the bell crank 108 will be shifted to move the bar 103 and shafts 27 and 27ᵃ to restore and lock the keys in normal position.

Means are provided for preventing the shift of the class voters' mechanism when the voter is admitted to the machine. For this purpose a crank arm 125 on the shaft (see Figs. 9, 10 and 11) is connected by an upwardly extending link 126 to a pin 127. This pin extends through a slot 128 in the back plate 77 of the machine and is connected to a horizontal arm 129 connected by a pivoted pin 130 at one end to the back of the machine. When the voter is admitted to the machine he shifts the main operating lever 101 and parts controlled thereby to the left, as shown in Fig. 10. This brings the ratchet plate 98 just above the bar 129, and, through the medium of the link 126 and arm 125, locks the shifter 70 for the class voters' mechanism against movement. The class voters' mechanism must therefore be set in position before the voter is admitted to the machine, because when the shaft 70 is moved from one position to the other the link 126 raises the bar 129 up into the path of movement of the ratchet plate 98, as shown in Fig. 11 in dotted lines, and then moves it back again to normal position upon the complete shift of the crank 71. It is therefore impossible for the voter to move the carriage of the main operating mechanism to the left and unlock the machine while the class voters' mechanism is being shifted. Moreover, the bar 129 compels the complete shift of the class voters' mechanism to one or the other of its positions, either for regular or for restricted voters, or the carriage can not be shifted to unlock the machine.

It is obvious that numerous changes may be made in the details set forth without departure from the essence of the invention.

I claim as my invention:—

1. In voting machines, the combination with a number of sets of ballot indicators or keys, of a corresponding number of sets of interlocking blocks, spreaders for said blocks connected to and operated by said keys, means for limiting the movement of said blocks and class voters' mechanism comprising a number of supplemental spreaders, one for each set of blocks, and a shifter whereon said supplemental spreaders are adjustable into and out of operative position.

2. In voting machines, the combination with a number of office rows of ballot indicators or keys, of a corresponding number of sets of interlocking blocks, spreaders for said blocks connected to and shifted by said keys, means for throwing separate sets of interlocking blocks and spreaders into groups, means for limiting the movement of the different sets and groups, and class voters' mechanism comprising a series of supplemental spreaders one for each set of interlocking blocks and an oscillating shifter whereon said supplemental spreaders are adjustable either to operative or inoperative position.

3. In voting machines, the combination with a number of office rows of ballot indicators or keys, of a corresponding number of sets of interlocking blocks, spreaders for said blocks connected to and shifted longitudinally by said keys, said blocks and spreaders being laterally movable independently of said keys, means for throwing separate sets of blocks and spreaders into groups and so limiting their lateral movement, and class voters' mechanism comprising a number of supplemental spreaders one for each set of interlocking blocks, said supplemental spreaders being laterally shiftable with said blocks and a shifter for said supplemental spreaders whereon the same are adjustable to and out of operative position.

4. In voting machines, the combination with a number of office rows of ballot indicators or keys, of a corresponding number of sets of interlocking blocks, spreaders for said blocks connected to and shifted by said keys, detachable connections between the end blocks of adjacent sets for throwing the same into groups, means for limiting the movement of the sets and groups of blocks, and class voters' mechanism comprising a number of supplemental spreaders one for each set of blocks and an oscillating shifter whereon said supplemental spreaders are adjustable into and out of operative position.

5. In voting machines, the combination with a number of office rows of ballot indicators or keys, of a corresponding number of rows of interlocking blocks, spreaders for said blocks connected to and operated by said keys, means for connecting adjacent rows of blocks into groups, means for limiting the movement of the sets and groups of blocks and class voters' mechanism comprising a number of supplemental spreaders one for each set of blocks, and a shifter whereon said supplemental spreaders are adjustable into and out of operative position.

6. In voting machines, the combination with a number of office rows of ballot indicators or keys, of a corresponding number of rows of interlocking blocks, spreaders for said blocks connected to and longitudinally shifted by said keys, said spreaders and blocks being laterally movable independently of said keys, means for connecting the opposite end blocks of adjacent rows to arrange the same in groups, means for limiting the lateral movement of the different sets and groups of blocks, and class voters' mechanism comprising a supplemental set of spreaders one for each set of blocks, an operating rock-shaft for said supplemental spreaders and arms adjustable on said rock-shaft to which said spreaders are connected.

7. In voting machines, the combination with a number of office rows of ballot indicators or keys, of a corresponding number of sets of interlocking spreaders and spacing devices, means for limiting the lateral movement of said spreaders and spacing devices and class voters' mechanism comprising a number of supplemental spreaders one for each set of interlocking spreaders and spacing devices, a shifter whereon said supplemental spreaders are adjustable into and out of operative position and locking means for holding said spreaders in adjusted position.

8. In voting machines, the combination with a number of office rows of ballot indicators or keys, a corresponding number of rows of interlocking blocks, spreaders for said blocks connected to and operated by said keys, means for connecting adjacent rows of blocks into groups, means for limiting the movement of the separate sets and groups of blocks and class voters' mechanism comprising a number of supplemental spreaders one for each set of blocks, a series of arms whereon said supplemental spreaders are pivoted, supports whereon said arms are rotatable, an operating shaft shiftable through said arms and whereon said arms are adjustable and a lock for holding said operating shaft in position.

9. In voting machines, the combination with a number of sets of ballot indicators or keys, counters controlled by said keys and operating mechanism controlling the movement of said keys and counters, an adjustable class voters' lock-out and interlocking devices between said lock-out and said operating mechanism.

10. In voting machines, the combination with a number of office sets of ballot indicators or keys, of interlocking mechanism for said keys, an adjustable class voters' lock-out coöperating with said interlocking mechanism, locking and restoring devices for said keys and means for preventing the shift of said class voters' lock-out while said keys are released for operation.

11. In voting machines, the combination with a number of office rows of ballot indicators or keys, of interlocking mechanism for said keys, an adjustable class voters' lock-out coöperating with said interlocking mechanism, means for restoring and locking said keys and devices for preventing the shift of said locking and restoring means to release said keys during the operation of said class voters' lock-out.

12. In voting machines, the combination with a number of pairs of keys for voting on amendments and an interlocking device between each pair of keys, of a class voters' lock-out for said amendment keys comprising interlocking spreaders connected to said keys, means for limiting the movement of said spreaders and a supplemental spreader for taking up the lost play between said interlocking spreaders.

13. In voting machines, the combination with a number of pairs of keys for voting on amendments arranged in rows and an interlocking device for each pair of keys, of a class voters' lock-out for said amendment keys comprising a number of rows of blocks one for each row of amendment keys, spreaders for said blocks connected to and shifted by said keys, means for limiting the movement of said blocks, a number of supplemental spreaders one for each row of blocks and an operating shifter whereon said supplemental spreaders are adjustable into and out of operative position.

14. In voting machines, the combination with a series of regular candidate keys and a number of amendment keys arranged in pairs with an interlocking device between each pair of amendment keys, of a number of interlocking spreaders one connected to each of said keys, means for limiting the movement of said spreaders, and a class voters' lock-out comprising a number of supplemental spreaders for taking up the lost play of said interlocking spreaders and an operating shifter whereon said supplemental spreaders are adjustable into and out of operative position.

15. In voting machines, the combination with a number of office rows of regular candidate keys and a number of rows of amendment keys arranged in pairs with an interlocking device between each pair of amendment keys, of a number of rows of interlocking blocks one for each row of regular candidate and amendment keys, spreaders for said blocks connected to said keys, means for limiting the movement of said blocks and a class voters' lock-out comprising a number of supplemental spreaders one for each row of blocks, and an operating shifter whereon said supplemental spreaders are adjustable into and out of operative position.

16. In voting machines, the combination with a column of keys, part arranged for voting on regular candidates and part arranged in pairs with an interlocking device between each pair for voting on amendments, of a combined straight ticket and restoring member for said regular candidate keys and a restoring member for said amendment keys having a one-way engagement with said combined straight ticket and restoring member for said regular candidate keys.

17. In voting machines, the combination with a number of columns of keys, part of each column being arranged for regular candidates and part arranged in pairs, an interlocking device between each pair for voting on amendments, interlocking mechanism between said regular candidate keys, a combined straight ticket and restoring member for said regular candidate keys having a lost motion connection therewith, a series of restoring members for said amendment keys having a one-way engagement therewith and operating mechanism controlling the movement of said restoring members for said amendment keys, said restoring members having one-way connections to combine straight ticket and restoring members.

JAMES H. DEAN.

Witnesses:
 HARRY L. CLAPP,
 KATHARINE GERLACH.

---

Copies of this patent may be obtained for five cents each, by addressing the "Commissioner of Patents, Washington, D. C."